Aug. 13, 1940.   G. H. HENRIETTA   2,211,115
REGISTER
Original Filed Jan. 1, 1933   3 Sheets-Sheet 1
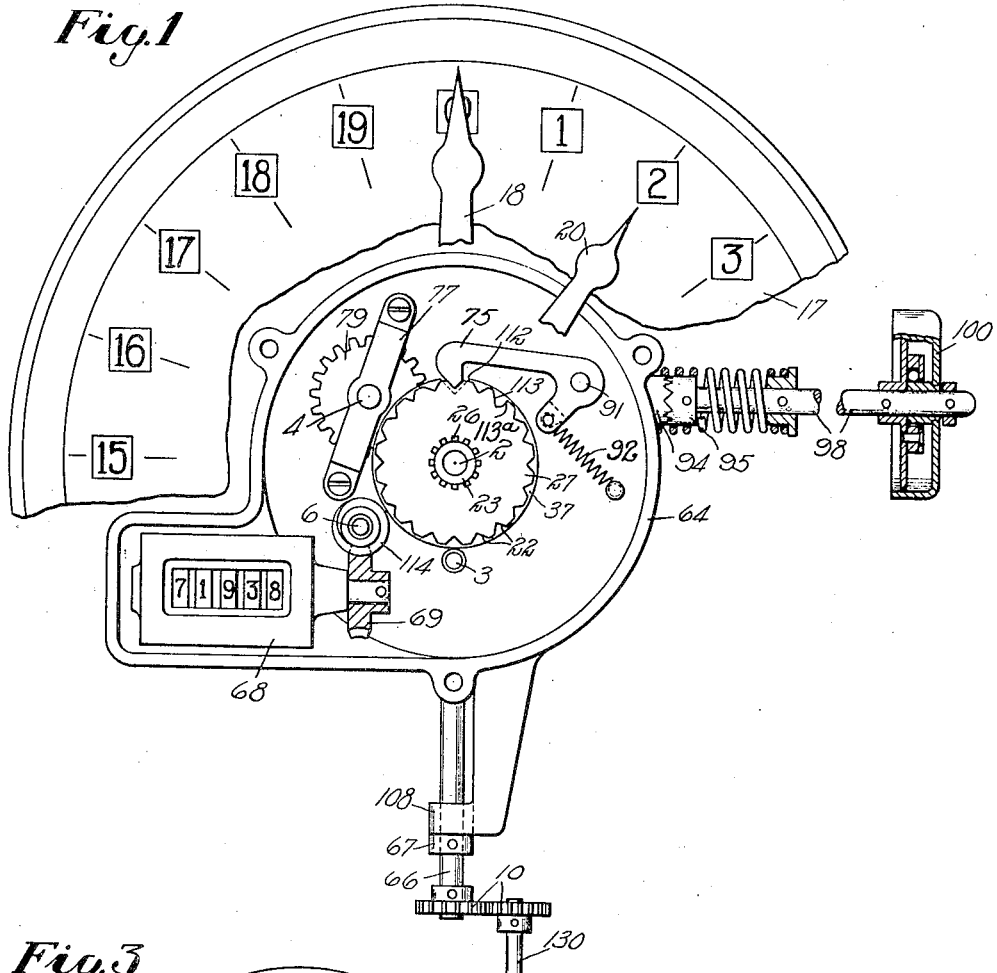
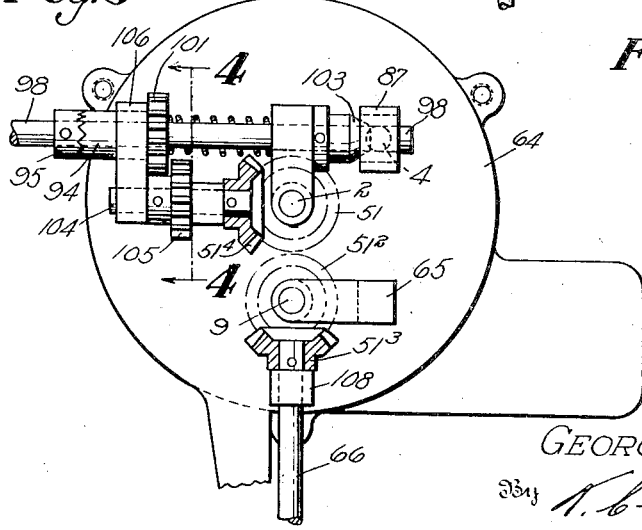
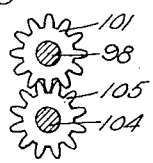
Inventor
GEORGE H. HENRIETTA
By N. Clay Lindsey
Attorney

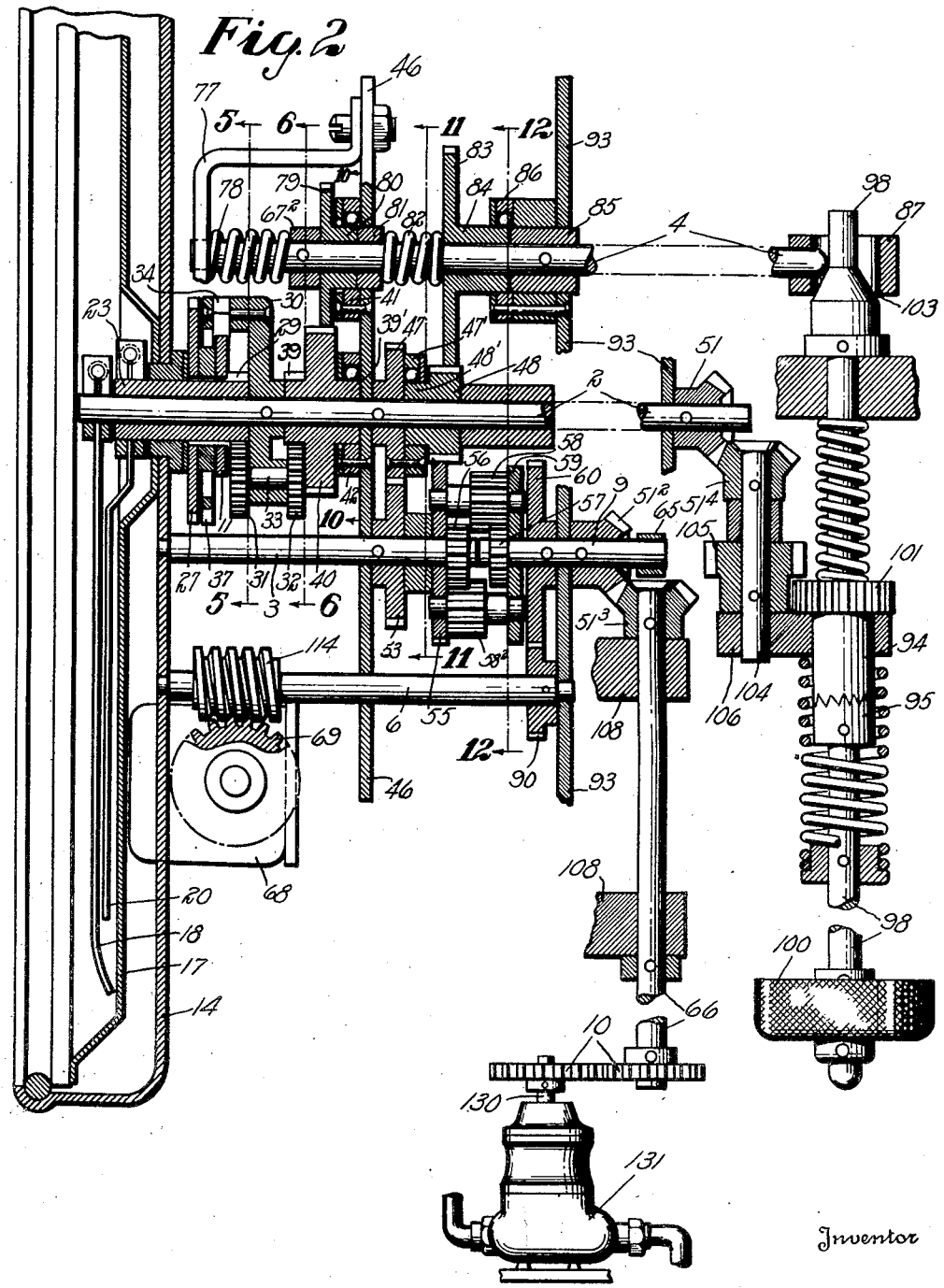

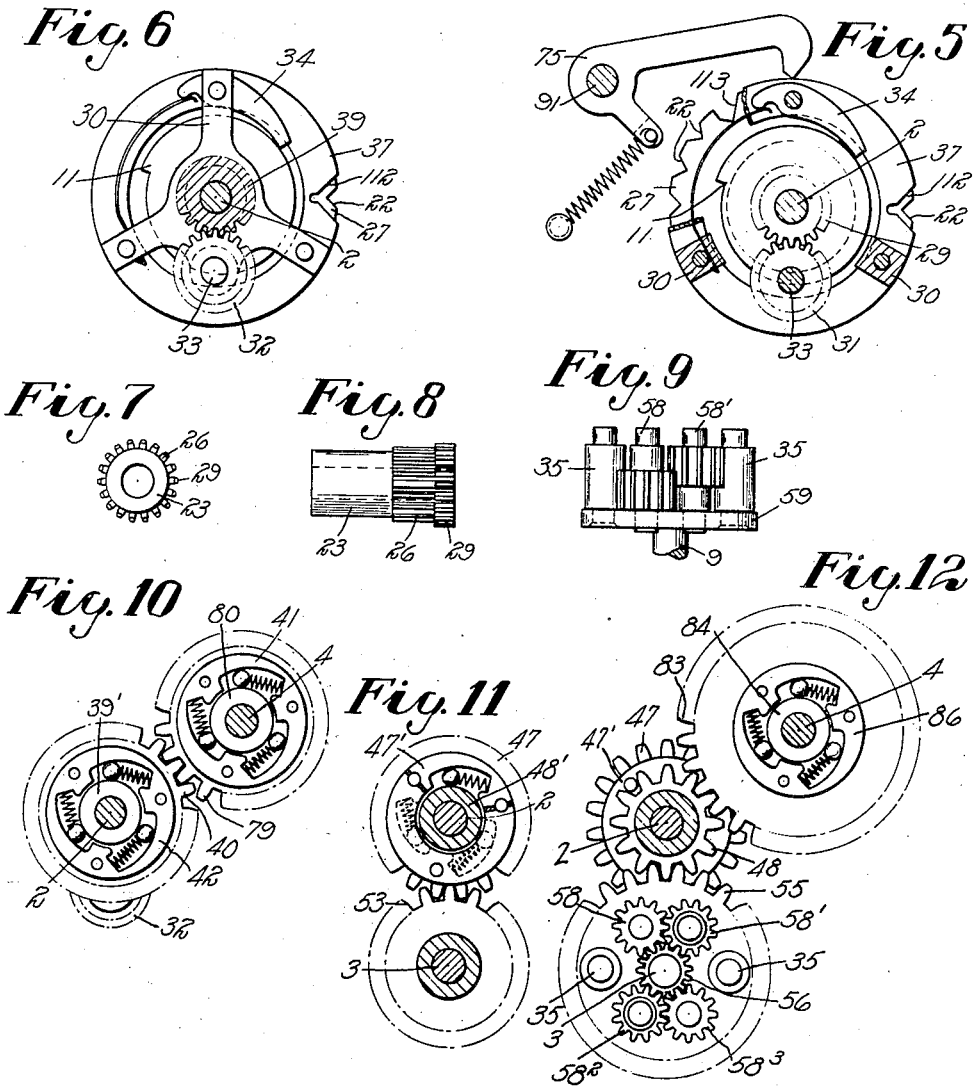

Patented Aug. 13, 1940

2,211,115

UNITED STATES PATENT OFFICE 2,211,115

REGISTER

George H. Henrietta, Hartford, Conn.

Original application January 1, 1933, Serial No. 652,454. Divided and this application September 8, 1938, Serial No. 228,891

7 Claims. (Cl. 235—1)

The present invention is divided from an application which resulted in United States Patent No. 2,130,130 granted to me on Sept. 13, 1939 and which relates to a Register operating mechanism. This divisional application is directed to a justifying mechanism which discharges an interdependent and appropriate correlative and integrated registering function.

The present invention has been designed with primary intention for service in connection with apparatus for dispensing gasoline in retail vending at filling stations and in which a pump acts to discharge the gasoline through a liquid meter upon the opening of a delivery valve which causes a power output spindle of the meter to revolve in harmony with the volume rate of dispension. A registering mechanism is coupled to and driven by the rotation of the meter's spindle.

Accuracy in indicating the meter performance is a desirable attribute in a register and the justifying mechanism is integrated in a resettable register to compensate for or to cancel the inaccuracies in visual indication which friction, gravity, and inertia effects of activity of the register tend to impose upon the backlash or lost motion which is present in the driving train connecting the meter to the indicating elements. In the disclosed register mechanism a continuously meshed reverted train of spur gears is utilized to produce the desired definite relative angular velocity ratio between driving and driven members to which resettable indicating hands or pointers are attached to denote the meter performance in correlation with radially disposed and fixed graduations on a dial. Backlash is present in the reduction train, being provided there either for constructional reasons of ease of functioning or arising by reason of wear of the several parts.

The presence of backlash in the reduction gearing implants a non-accumulative error in the angular correlationship of the hand that indicates in multiples relative to the hand that indicates in units and of the hands relative to the fixed indicating elements or dial graduations and thus introduces the probability that at certain stages of indication the multiples indicating hand may lead or outstrip the other hand from an accurate relative position by the angular amount of the backlash while at other stages it may similarly be tardy or lag behind.

The particular distinction and the signal merit of this invention is that in commercial service a register constructed in accordance therewith maintains a positive geared connection between the external driving mechanism, which may be a fluid meter, and the resettable indicating element of lowest order and a justifying means for that element throughout all phases of register activity and in opposition to all forces which are less than destructive. The connection extends from the power source to the justifying means for the indicating element of higher order through the medium of continuously engaged spur gears together with their driving and supporting shafts.

An object of the invention, accordingly, is to provide means to countervail friction, gravity, and inertia effects upon the backlash or lost motion in a continuously engaged reduction train of spur gears in a resettable register.

A further object of the invention is to provide a resettable register structure which maintains one member of a justifying mechanism in continual positive connection with the driving mechanism whose operative movements are to be indicated by the register.

A further object of the invention is to provide a refinement in alignment between the movable and the fixed indicating elements of a resettable register by compensating the lost motion in a reduction train of spur gearing which is utilized to produce a relative angular velocity ratio between the movable indicating elements.

Another object of the invention is to provide means to justify reset alignment at a definte and clear zero reading upon resetting the indicating elements in a retrograde direction.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

The invention is described in specific detail in reference to the accompanying drawings which show, for purpose of illustration, an embodiment which the invention may assume in practice when incorporated in a register of the clock or dial character and having movable hands or pointers which indicate in correlation to fixed graduations of a dial.

The invention may be adapted to registers having other types of indicating elements.

In the drawings:

Figure 1 is a view in front elevation, partly broken away, to show the justifying mechanism and the relative angular dispositions of the principal shafts so that the register movement may be accommodated within a compact case or housing which may be in the rear of and attached to the dial housing 14;

Figure 2 shows a diagrammatic, longitudinal and partially sectional, view of the register movement, the same being taken for clarity on an irregular line which bisects the axes of all of the principal shafts which are inside the case for the movement. This view also shows a liquid meter, which is delineated at a reduced relative scale, as an example of an external driving mechanism in maintainable positive driving connection to the indicating shaft of a resettable register;

Figure 3 is a view in rear elevation of the case or housing for the register movement, the resetting shaft, with associated mechanism, and the register drive shaft being shown journaled in bosses upon the case;

Figure 4 is a detail view which shows the relation of certain gears on the resetting shafts, this same being taken on the line 4—4 of Figure 3;

Figure 5 is a view taken substantially on line 5—5 of Figure 2 and showing the justifying mechanism and a portion of the reduction train of spur gears which produces the relative angular velocity ratio between the indicating elements.

Figure 6 is another detail view of the justifying mechanism, the same being taken transversely on Figure 2 at the line 6—6 and looking in the direction of the arrows;

Figure 7 is an end view of the quill which carries one of the indicating elements;

Figure 8 is a side view of the quill;

Figure 9 is a detail view showing the cage in which the planetary pinions of the driving and resetting train are rotatably mounted and secured;

Figure 10 is a transverse, partially sectional, view of the particular gears together with their associated ball clutches whose function it is to control certain driving and resetting functioning of the reverted train reduction gearing, this view being taken on the left surface plane of the partition plate 46, Figure 2, and looking in the direction of the arrows 10—10;

Figure 11 is a transverse, partially sectional, view of the gears connecting the indicating shaft with the jack shaft, together with an associated ball clutch which functions as a clutch only during and as a result of resetting rotation of the indicating shaft; this view being taken on line 11—11, Figure 2, looking in the direction of the arrows; and Figure 12 is a transversely taken, partially sectional, view taken on the line 12—12 of Figure 2 and looking in the direction of the arrows, and showing the sun and planet gearing of the drive train which transmits movement from the power shaft of the register to the indicating shaft, but not conversely, and also showing the associated gearing which anchors the planetary pinions mounting gear during indicating activity and which transmits to and imposes orbital movement on the planetary pinions during and as a result of resetting activity.

In the following detailed description there is first an explanation of the structure and functioning of the driving and resetting train which connects the meter 131 to the indicating shaft 2, then an explanation of the structure and functioning of the reduction gearing which connects and drives the quill 23 from and relative to the indicating shaft 2. The associated justifying mechanism which compensates for lost motion in the reduction gearing is next explained and that is followed by an exposition of the structure and functioning of the resetting mechanism. This is followed by an explanation of the driving connection to the totalizer counter or register.

The register, which is shown for purpose of illustration, is driven by a vertical shaft 66 mounted in bosses 108 attached to the case 64 and maintainable in positive mechanical connection to any external driving mechanism whose operative movements are to be registered. As shown in Figure 2, there is provided a pair of mating gears 10, one being secured to the drive shaft 66 and the other to the power output spindle 130 of a liquid meter 131, thus establishing a direct drive from the meter to the register for the purpose of denoting the volume quantity of the displacement pressure flow of gasoline through the meter and to the fuel tank of a motor vehicle. Safety requires that the gasoline be delivered under confinement and consequently the purchaser must accept and pay for quantity upon faith in the ability and integrity of the register.

Referring to Figure 2, there is secured to the upper end of power shaft 66, a bevel gear $51^3$ with a bevel gear $51^2$ secured to a horizontal shaft 9. The shaft 9 carries a sun gear 57 in axial alignment with another sun gear 56 integrally carried on a shaft 3. The sun gears 56 and 57 are in maintained positive operative connection through the medium of planetary pinions 58, 58′, $58^2$, and $58^3$. These planetary pinions 58 are assembled in mating pairs with one pinion in each pair in maintained engagement with one of the sun gears while the other pinion of each pair is likewise maintained in engagement with the other sun gear. As hereinafter pointed out, during the indicating phase of operation, the pinions are prevented from orbital rotation and this restraint causes them to then function simply as idlers to transmit the rotation of shaft 9 to shaft 3 in a reversed rotational direction.

It may be noted that only one pair of the planetary pinions 58 is essential to production of the desired functioning and that the other pair simply counterbalances the structure. The planetary pinions 58 are rotatably mounted in bearings provided in the side walls of what amounts to a cage. This cage is formed of a gear 55 and a side plate 59, which are joined or secured together by shouldered studs 35 and 35, (see Figures 9 and 12). The gear is rotatably mounted upon the shaft 3 while side plate 59 is similarly mounted on the shaft 9. There is also secured to shaft 3 a spur gear 53 which is maintained in mating engagement with a gear 47 secured on the indicating shaft 2 this completing the maintainable geared connection from the external power source to the indicating shaft.

The gear 55 meshes with an intermediate gear 48 mounted on shaft 2 and normally and during the indicating phase of activity the gears 48 and 55 are anchored against rotation by gear 83 which meshes with the former and is held from turning by clutch 86, Figures 2 and 12.

Recapitulating the recital of the components of the maintainable geared connection from power source 131 to indicating shaft 2, it evidently comprises the following enumerated gears together with their driving and supporting shafts. Gears 10, shaft 66, bevel gears $51^3$ and $51^2$, shaft 9, sun gear 57, planetary pinions 58, 58′, $58^2$, and $58^3$, sun gear 56, shaft 3, spur gears 53 and 47, the latter on indicating shaft 2. Every gear in the just enumerated driving connection is secured to its driving and supporting shaft and maintained in engagement with its mating gear, throughout all phases of register activity. It is evident that any and all other component elements which have positive connection to the indicating shaft partake in this maintainable positive geared connection to the power source.

The indicating element of lowest order 18 is secured to the indicating shaft 2 and the indicating element of higher order 20 is secured to the quill 23 rotatably mounted on the indicating shaft 2. The hands may be attached to their driving and supporting members in any wellknown manner, as by a clamp, pin, key, wedge or match machining. The driving connection from indicating shaft 2 to quill 23 is through the medium of a continuously meshed reverted train of spur gears which comprises sun gear 39, planetary pinions 32 and 31 and a sun gear 29. The sun gear 39 is rotatably mounted upon the indicating shaft 2 and is permanently prevented from rotating in the direction of indication by a ball clutch assembly 42, (Figures 2 and 10) which is fastened to a partition plate 46 and accommodates the concentric clutch collar or hub 39' of the sun gear 39. Clutch 42 permits sun gear 39 to be rotated in the retrograde direction for purpose of resetting the indicating element 20, as hereinafter explained.

The control of the rotation of the sun gear 39 by the ball clutches 42 and 41, Figure 10, eliminates the possibility of any force less than destructive causing or producing a movement of the indicating element 20 in the progressive direction except only as a movement of denotation which is transmitted through the drive train from the power shaft in the intended manner.

There is also secured to the indicating shaft 2 a spider 30 (Figures 2 and 6) having an arm in which a shaft 33 is journalled. The shaft 33 has secured thereon the planetary pinions 32 and 31. The pinion 32 meshes with the sun gear 39 and the pinion 31 meshes with a sun gear 29 formed integral with the quill 23. The desired angular velocity ratio of indicating element 20 relative to indicating element 18 is obtained by providing the sun gear 39 with nineteen teeth and the mating planetary pinion 32 with twenty teeth, whereas pinion 31 and its mating sun gear 29 are each provided with an equal number of teeth. The effect of the enumerated gear tooth ratios is to insure that the quill 23 together with its indicating hand 20 is driven at a relative speed which is one-twentieth that of the angular velocity of the indicating shaft.

The teeth of the gears 39, 32, 31, 29, which compose the reverted train, are assumed to be sized and the gear center distances located within tolerances consistent with interchangeable manufacturing practice. Consequently, backlash is inherently present in the assembled train, being provided for ease of movement and being liable to increase as the gears and their bearings wear in service.

The residence of backlash in the reduction gearing is unfavorable to accurate indicating because at the completion of random stages of functioning the hand 20 may lead or outstrip the hand 18 from an accurate relative position by the angular aggregate of the backlash while at other stages it similarly may be relatively tardy and lag behind. Lacking the justifying mechanism, errors in indication, which result solely from the residence of backlash, will be visually manifested either as an excess or as a deficiency in alignment of the hand 20 relative to the dial graduations. It is important that when the hand 18 is stopped at zero indication upon completion of any multiple of units of indication, the hand 20 shall then exactly align with the proper dial graduation mark.

The reverted train of reduction gearing 39, 32, 31, 29, drives the quill 23 at one-twentieth of the velocity of the indicating shaft. Because the indicating shaft is turning faster than the quill, the bearing friction of shaft to quill tends to drive the quill at the shaft speed, and this causes the quill and the hand 20 to tend to lead or to outstrip a correct relative angular position by the angular amount of the backlash which is then being taken up in a leading direction, as noted. This tendency to lead is assisted by gravity effect upon the hand 20 when that hand is descending.

When the hand 20 is progressively operated past the ten graduation and then starts to ascend the gravity influence upon that hand then tends to cause it to lag behind from a true relative position and by the angular aggregate of the backlash. The inertia effect from halting operation causes the backlash to temporarily take up in a leading direction.

The resultant errors are all compensated for by a justifying mechanism constructed and functioning in a manner which is now set forth. A justifying ring or disc 37, Figures 1, 5, and 6 is provided with a single notch 112 and is secured to the spider 30 with the notch 112 in definite and maintained angular relation to the indicating element 18. Another justifying disc 27 is provided with a plurality of notches 22 and a single specially formed notch 113 having an abrupt stop face 113a. These notches in disc 27 correspond in aggregate and in relative angularity to the graduated subdivisions of the dial 17. This multiple notched disc 27 is match machined to fit on portion 26 of the quill 23 in definite and maintained angular relationship of the unique notch 113 to the tooth of a one-tooth ratchet 11 which also fits on portion 26 of quill 23 and which is also relative angularly positioned by match machining to the indicating element 20.

A detent 75 (Figures 1 and 5) of sufficient width to span the peripheries of both the discs 27 and 37 in their assembled relationship, is pivoted at 91 and normally is urged into contact with the periphery of disc 37 which is slightly greater in diameter than the disc 27. The notch 112 of ring 37 is match machined to correspond at engagement with the wedge-shaped working end of the detent. Engagement of detent with notch 112 occurs at a point where indicating element 18 is in alignment with the zero graduation of the dial 17, the detent impelled by the spring 92 may then enter notch 112 of ring 37 and whichever notch of disc 27 that the reduction gear train has brought into approximate alignment. The pressure of the detent in the appropriate notch of disc 27 takes up the backlash in the reduction gearing to compensate for either lead or lag from an accurate position of the hand 20 and thus produces a refinement in the alignment of the hand with the dial graduation. The detent also serves as a stop for the resetting operation to then align the indicating elements at zero indication, as will be disclosed in connection with the explanation of the register resetting operation, which follows.

It has been shown that a positive geared connection obtains between the register indicating shaft and an external driving mechanism, and asserted that the connection is maintainable while permitting a resetting at will from any casual point to which the indicating elements might be operated, with resetting to occur in a retrograde direction. This feat necessitates a neutralization of the transmitting capability of the sun and planet gearing, which is incorporated in the main drive. The neutralization is educed during and as a result of the resetting activity.

The register is provided with a clutch-controlling shaft 4 (Figures 1 and 2) whose axis parallels the axis of the indicating shaft 2. The clutch-controlling shaft is mounted for rotatable and longitudinal movement with one end, at the left of Fig. 2 journaled in the bracket 77, the other end being journaled in the case 64 and projecting into the aperture of the apertured boss 87 which is formed integral with the case. The shaft 4 is urged to the right by the partially compressed spring 78 which is mounted upon the shaft and interposed between the bracket 77 and a collar $67^2$ pinned to the shaft 4. The reaction of the spring is taken by the end of a resetting shaft 98 which extends into the apertured boss 87.

Gears 79 and 83 are rotatably mounted upon the shaft 4 and these gears have hubs 80 and 84, respectively. Secured to the partition plate 46 and also to the back plate 93, in concentric relation to the hubs of these gears, are the ball clutch cam plates 41 and 86, (Figs. 2, 10 and 12). Ball clutch 41 is related to gear 79 and ball clutch 86 is related to gear 83. The clutch balls normally engage with the hubs of gears 79 and 83, each in a manner to normally anchor those gears against rotation in the direction that indicating activity of the register tends to turn gears 79 and 83 through their intermeshing gears, 40 and 48 on shaft 2.

Gear 79 being anchored against rotation, it follows that its mating gear 40, with which sun gear 39 of the reduction gearing is integrated, is also anchored against rotation. Gear 83 being anchored against rotation, it follows that the intermeshing pinion 48 is likewise anchored and through engagement with the planetary pinion mounting gear 55 it transmits anchorage to gear 55 which, accordingly, holds the planetary pinions 58 against orbital rotation during indicating activity of the register.

To accomplished a resetting to zero indication from any casual point of denotation to which the register may have been operated, longitudinal pressure is manually applied to the resetting shaft 98 through the reset knob 100. This causes the conical cam member 103 on shaft 98 to force the shaft 4 to the left against the pressure of the spring 78. Gears 79 and 83 move with the shaft 4 and the clutch balls of clutches 41 and 86 are thus shifted to the collars 81 and 85 on shaft 4. This conditions gears 79 and 83 to be independently rotatable in response to an applied force which is greater than the friction load of springs 78 and 82.

In longitudinally moving the resetting shaft 98, the gear 101 on that shaft is slid into engagement with the gear 105 which is maintained in positive connection with indicating shaft 2 through the shaft 104 and the bevel gears $51^4$ and 51. The pinion 48, which is continuously engaged with the anchoring gear 83 and the planetary pinion mounting gear 55, is rotatably mounted upon the indicating shaft and is provided with a hub 48′, which extends into a ball clutch cam plate assembly 47′. The cam plate assembly 47′ is secured for rotation to the gear 47 which is secured to the indicating shaft 2.

During indicating activity of the register ball clutch cam plate 47′ turns freely about the then stationary hub 48′ of pinion 48 but seizes the hub upon the reversal of rotational direction of the indicating shaft for resetting. The anchoring gears 79 and 83 being unlocked and a driving connection being established between the resetting shaft 98 and the indicating shaft, maintained manual pressure on the resetting knob combined with rotation, in the only direction that the clutch in knob 100 can rotate shaft 98, transmits a rotation to the indicating shaft in the retrograde direction. This causes the clutch 47′ to seize the hub 48′ of the gear 48 and then gears 47 and 48 rotate as a unit.

During the resetting operation, the gear 47 also rotates the sun gear 56, through the positive connection of gear 53 and shaft 3, while the pinion 48 is simultaneously rotating gear 55 at a different velocity and is thus imparting planetary activity to the planetary pinions 58. The resultant of rotative forces, of this simultaneous activity of the sun gear 56 and the intermeshing planetary pinions 58 impose a zero movement on the sun gear 57 causing that sun gear to remain stationary and subject to no torque whatsoever while remaining in positive geared connection to the indicating shaft and likewise in positive geared connection to the external driving mechanism 131.

For the purpose of resetting the hand 20, a pawl 34, (Figs. 2, 5 and 6) is pivoted between a leg of the spider 30 and the justifying ring 37 in a position to ride on the periphery of the one-tooth ratchet 11 which is secured to the portion 26 of the quill 23. When in the resetting rotation of shaft 2, the pawl 34 engages with the tooth of the ratchet 11, the quill 23 is then rotatable as a unit with the indicating shaft because sun pinion 39 is then free to turn in retrograde direction, not being then anchored by gear 79. At the engagement of the pawl 34 with the tooth of the ratchet 11, the unique notch 113 of the justifying disc 27 is in angular alignment with the notch 112 of the ring 37 and the hands 18 and 20 are likewise in line with each other. Continued resetting rotation of the indicating shaft results in detent 75 interlocking with the unique notch 113 of the justifying disc 27 and this interlocking halts the resetting operation with both hands aligned at the zero indication.

Should resetting forces continue to be applied to the resetting shaft 98 after the interlocking of detent 75 with notch 113, no injury will result to the mechanism. There is provision in the serrations of the hub of the gear 94 and the collar 95 on the resetting shaft 98, to slip the serrations relative to each other rather than to transmit excessive force to injure any of the connected parts.

Upon completion of a resetting operation the resetting knob 100 is released, this permits shafts 98 and 4 to react under pressure of their respective springs. Gears 79 and 83 and their connected gears are then again anchored, and the device is ready to resume indicating activity.

The register is provided with a totalizer register 68, (Figs. 1 and 2) which is driven from gear 60 on the shaft 3 to gear 90 on the shaft 6 to which is secured the worm 114 which meshes with worm gear 69 on the drive shaft of the totalizer 68. As shaft 3 is actuated only during indicating operation the totalizer is unaffected by resetting activity.

As many changes could be made in the above construction and many apparently widely different embodiments of this invention could be made without departing from the scope thereof, it is intended that all matter contained in the above description or shown in the accompanying drawings shall be interpreted as illustrated and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a register, a plurality of movable indicating elements, means for driving said elements including planetary reduction gearing therebetween for driving one of said elements through a complete revolution for each definite fraction of a revolution transversed by the other element, means for resetting said elements in a retrograde direction, and means to justify for the effects of gravity and inertia upon backlash in said gearing upon each complete rotation of one of said elements and also for halting the resetting operation when said elements reach a zero position.

2. In a register, a dial graduated from a zero position, a plurality of indicating elements movable over said dial, mechanism for driving said elements including gearing for driving one of said elements through a definite fraction of a revolution for each complete revolution transversed by the other element, and means for compensating for backlash in said gearing comprising cooperative members respectively rotatable with said elements, one of said members having a notch corresponding to a zero position and the other said member having a plurality of notches respectively corresponding to a zero position and the subdivisions of the dial and a common detent cooperating with said members and adapted to engage in said notches.

3. In a register, a dial graduated from a zero position, a plurality of indicator elements movable over said dial, mechanism for driving said elements including gearing for driving one of said elements through a definite fraction of the revolution for each complete revolution transversed by the other element, means for resetting said elements in a retrograde direction, and means for compensating for backlash in said gearing comprising cooperative members respectively rotatable with said elements, one of said members having a notch corresponding to zero position and the other of said members having a zero notch with a stop face and a plurality of notches corresponding to the subdivisions of the dial and a common detent cooperating with said notches and also serving as a stop when engaged in said notch with the stop face to halt the resetting operation when said elements reach zero position.

4. In a register, an indicator shaft, a quill rotatable thereon, indicating elements respectively rotatable with said shaft and quill, reduction gearing between said shaft and quill, a disc rotatable with said shaft and having a notch, a disc of smaller diameter than said first disc and rotatable with said quill and having a plurality of notches, and a common detent adapted to engage in said notch of the first disc and a notch of the second disc upon each complete revolution of the first mentioned element.

5. In a register, an indicator shaft, a quill rotatable thereon, indicating elements respectively associated with said shaft and quill, means for rotating said indicating elements and including reduction gearing of the reverted type between said shaft and quill, means for resetting said indicating elements in a retrograde direction, a disc rotatable with said indicator shaft and having a notch, a disc of smaller diameter than the first disc and rotatable with said quill and having a plurality of notches, one of which is provided with a stop face and a common detent adapted to engage in said notch of the first disc and a notch of the second disc upon each complete revolution of the first mentioned element, said detent when engaged in said notch having a stop face serving to halt the resetting operation when said indicating elements are reset to zero.

6. In a register, indicating elements, a power shaft, an indicator shaft driving one element, a quill driving the other element, a positive maintained geared connection between said power shaft and indicator shaft, means for resetting said indicating elements while maintaining said geared connection, reduction gearing between said indicator shaft and quill, and means to compensate for backlash in said reduction gearing and including a notched disc on said indicating shaft, a notched disc on said quill and a detent common to both of said discs.

7. In a register, indicating elements, a graduated scale cooperating with said indicating elements, a power shaft, an indicator shaft driving one element, a quill rotatably mounted on the indicator shaft and driving the other element, toothed gearing for transmitting rotation of the indicator shaft to the quill, a positive maintained geared connection between said power shaft and indicator shaft, means for resetting said indicating element in the retrograde direction while maintaining said positive connection, and means to compensate for lost motion in said reduction gearing and for halting the resetting operation and including a notched disc rotatable with one of said indicating elements, a notched disc rotatable with another of said indicating elements, and a common detent adapted to engage in the notches of said discs upon each complete rotation of one of said discs one of said notches having a stop face adapted to cooperate with said detent.

GEORGE H. HENRIETTA.